US009942167B2

(12) United States Patent
Pairault et al.

(10) Patent No.: US 9,942,167 B2
(45) Date of Patent: Apr. 10, 2018

(54) MESH PLATFORM UTILITY COMPUTING PORTAL

(71) Applicant: MICROSOFT TECHNOLOGY LICENSING, LLC, Redmond, WA (US)

(72) Inventors: Remy Pairault, Redmond, WA (US); Christropher Lee Mullins, Kirkland, WA (US); George Moore, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/993,812

(22) Filed: Jan. 12, 2016

(65) Prior Publication Data

US 2016/0127266 A1    May 5, 2016

Related U.S. Application Data

(63) Continuation of application No. 13/209,231, filed on Aug. 12, 2011, now Pat. No. 9,245,286, which is a
(Continued)

(51) Int. Cl.
*G06F 15/16* (2006.01)
*H04L 12/911* (2013.01)
(Continued)

(52) U.S. Cl.
CPC .......... *H04L 47/828* (2013.01); *G06Q 10/06* (2013.01); *G06Q 10/0637* (2013.01); *G06Q 30/04* (2013.01); *H04L 67/34* (2013.01)

(58) Field of Classification Search
CPC .............. H04N 1/6011; H04N 21/4435; G06F 12/0897; G06F 15/16
(Continued)

(56) References Cited

U.S. PATENT DOCUMENTS

| 5,115,505 A | * | 5/1992 | Bishop | ............. | G06F 9/5044 |
| | | | | | 718/104 |
| 6,360,233 B1 | * | 3/2002 | Houldsworth | ........ | G06F 9/5016 |

(Continued)

OTHER PUBLICATIONS

"Amazon Elastic Compute Cloud (Amazon EC2)—Beta", Amazon Web Services TM, Retrieved from archive.org/web/web.php, dated May 1, 2008.
(Continued)

*Primary Examiner* — Tesfay Yohannes
(74) *Attorney, Agent, or Firm* — L. Alan Collins; Collins & Collins Intellectual, LLC

(57) ABSTRACT

A utility computing portal supports public and private modules for application development in a cloud computing environment. The public nodules support downloads, customer support and access to a development community. The private modules are accessible to users with valid login credentials or those authenticated via a related entity, such as a Live ID. The private modules may include modules for testing, analysis, and billing. The utility computing portal also supports access to application configuration, for example, allowing a manager to change the number of front end and backend physical/virtual machines available to various application roles.

18 Claims, 5 Drawing Sheets

Related U.S. Application Data continuation of application No. 12/241,761, filed on Sep. 30, 2008, now Pat. No. 8,019,873.

(51) Int. Cl.
  *G06Q 10/06* (2012.01)
  *G06Q 30/04* (2012.01)
  *H04L 29/08* (2006.01)

(58) Field of Classification Search
  USPC .......................... 709/223, 224; 705/80, 809
  See application file for complete search history.

(56) References Cited

U.S. PATENT DOCUMENTS

| | | | |
|---|---|---|---|
| 7,072,807 B2 | 7/2006 | Brown et al. | |
| 7,174,379 B2 | 2/2007 | Agarwal | |
| 7,174,534 B2 | 2/2007 | Chong et al. | |
| 7,185,192 B1 | 2/2007 | Kahn | |
| 7,200,657 B2 | 4/2007 | Adams et al. | |
| 7,228,106 B2 | 6/2007 | Choi | |
| 7,395,312 B2 | 7/2008 | Kothari et al. | |
| 7,596,620 B1 | 9/2009 | Colton et al. | |
| 7,702,843 B1 | 4/2010 | Chen | |
| 7,725,883 B1 | 5/2010 | Nylander | |
| 8,112,527 B2 | 2/2012 | Kawato | |
| 8,181,175 B1 | 5/2012 | McKee | |
| 8,286,174 B1 | 10/2012 | Schmidt | |
| 8,683,025 B2 | 3/2014 | Minato | |
| 8,849,971 B2 | 9/2014 | Ferris | |
| 2002/0040434 A1 | 4/2002 | Elliston et al. | |
| 2003/0061404 A1 | 3/2003 | Atwal et al. | |
| 2004/0203449 A1 | 10/2004 | Choi | |
| 2005/0155024 A1 | 7/2005 | Wannamaker | |
| 2005/0183091 A1* | 8/2005 | Van Eijndhoven | G06F 9/544 719/312 |
| 2005/0193373 A1 | 9/2005 | Wannamaker | |
| 2006/0161741 A1* | 7/2006 | Yasue | G06F 9/526 711/152 |
| 2006/0195816 A1* | 8/2006 | Grandcolas | G06Q 40/02 717/101 |
| 2006/0230150 A1 | 10/2006 | Roy | |
| 2007/0022143 A1* | 1/2007 | Trask | G06F 9/5016 |
| 2007/0078666 A1 | 4/2007 | Mouron | |
| 2007/0150480 A1 | 6/2007 | Hwang et al. | |
| 2007/0150749 A1* | 6/2007 | Monaghan | G06F 8/34 713/189 |
| 2007/0192453 A1* | 8/2007 | Copeland | H04L 12/66 709/223 |
| 2007/0265907 A1 | 11/2007 | Adduci, Jr. et al. | |
| 2008/0005020 A1 | 1/2008 | Auvenshine et al. | |
| 2008/0015880 A1* | 1/2008 | Freedenberg | G06Q 10/101 705/80 |
| 2008/0140472 A1 | 6/2008 | Gilat et al. | |
| 2008/0189081 A1 | 8/2008 | Chang et al. | |
| 2008/0201211 A1 | 8/2008 | Frank et al. | |
| 2009/0049422 A1 | 2/2009 | Hage et al. | |
| 2009/0080512 A1* | 3/2009 | Veerepalli | H04H 20/426 375/240.01 |
| 2009/0171889 A1* | 7/2009 | Friedlander | G06F 17/30312 |
| 2009/0210527 A1 | 8/2009 | Kawato | |
| 2009/0228862 A1 | 9/2009 | Bertelrud et al. | |
| 2009/0240935 A1* | 9/2009 | Shukla | G06F 9/44505 713/100 |
| 2009/0323121 A1* | 12/2009 | Valkenburg | G01B 11/002 358/1.18 |
| 2010/0027552 A1 | 2/2010 | Hill | |
| 2010/0042670 A1 | 2/2010 | Kamalakantha et al. | |
| 2010/0058354 A1 | 3/2010 | Fein et al. | |
| 2010/0077449 A1 | 3/2010 | Kwok | |
| 2010/0088150 A1 | 4/2010 | Mazhar et al. | |
| 2010/0154045 A1 | 6/2010 | Pairault et al. | |
| 2010/0162365 A1 | 6/2010 | Del Real | |
| 2011/0179176 A1 | 7/2011 | Ravichandran et al. | |
| 2012/0185368 A1 | 7/2012 | Schloter et al. | |

OTHER PUBLICATIONS

"Amazon Simple Storage Service (Amazon S3)", Amazon Web Services TM, Retrieved from archive.org/web/web.php, dated Apr. 27, 2008.

"Google App Engine", Google Code, Retrieved from archive.org/web/web.php, dated May 12, 2008.

Athow, D., "Microsoft's Red Dog to Compete with Google Apps Engine and Amazon's EC2," Apr. 2008.

"LiveSide—News Blog: Red Dog: Ray Ozzie's answer to the Google App Engine?," Apr. 2008.

Schonfild, E., "Microsoft's Mesh Revealed—Sync All Apps and All Files to All Devices (As Long As They're Windows)," Apr. 2008.

"I'm Running out of Cloud Metaphors: Also, Red Dog?," http://redmonk.com/sogrady/2008/04/09/microsoft_cloud/. Apr. 2008.

"Microsoft is Introducing Live Mesh, A Cloud Computing Platform," http://blogs.guardian.co.uk/technolog/2008/04/23/microsoft_is_introducing_live_mesh_a_cloud computing_platform.html Apr. 2008.

Markoff, J., "Software via the Internet: Microsoft in 'Cloud' Computing," New York Times Company, Sep. 2007.

"Microsoft Live Mesh Promises Consumer Cloud Computing," http://www.slashgear.com/microsoft-live-mesh-promises-consumer-cloud-computing-2311301.php. Apr. 2008.

U.S. Appl. No. 12/241,761, filed Sep. 30, 2008, Pairault.
U.S. Appl. No. 13/209,231, filed Aug. 12, 2011, Pairault.

\* cited by examiner

MESH PLATFORM UTILITY COMPUTING PORTAL

RELATED APPLICATION(S)

This Application is a Continuation of, and claims benefit from, U.S. patent application Ser. No. 13/209,231 that was filed on Aug. 12, 2011, and that is a Continuation of U.S. patent application Ser. No. 12/241,761 (U.S. Pat. No. 8,019,873) that was filed on Sep. 30, 2008 (Issues Sep. 13, 2011), each of which is incorporated herein by reference in its entirety.

BACKGROUND

A mesh computing environment allows a user to connect multiple devices, other users, storage together in a universally accessible framework. Applications and services may also be accessed via this mesh computing environment.

However, developing the applications and services accessible to such users can be problematic because the cloud computing environment in which such services are operated is not easily created or simulated. Because of this, developers can be at a disadvantage when attempting to develop or port applications, gadgets, services, etc. to a cloud computing environment.

SUMMARY

A portal specifically targeted at mesh computing developers allows developers access to a protected, secure space in which to develop and test applications and related tools or services in a real cloud computing environment, but without interference from inquisitive users, competitors, or disruptions from other developer's misbehaving applications. The portal provides support tools, development tools, security, application controls, and application analysis tools via the single point of entry.

Different levels of control allow a development manager to specify or change the level of resources available to the development team.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . ," or a similar sentence, there is no intent to limit the meaning of that term, either expressly or by implication, beyond its plain or ordinary meaning, and such tom should not be interpreted to be limited in scope based on any statement made in any section of this patent (other than the language of the claims). To the extent that any term melted in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
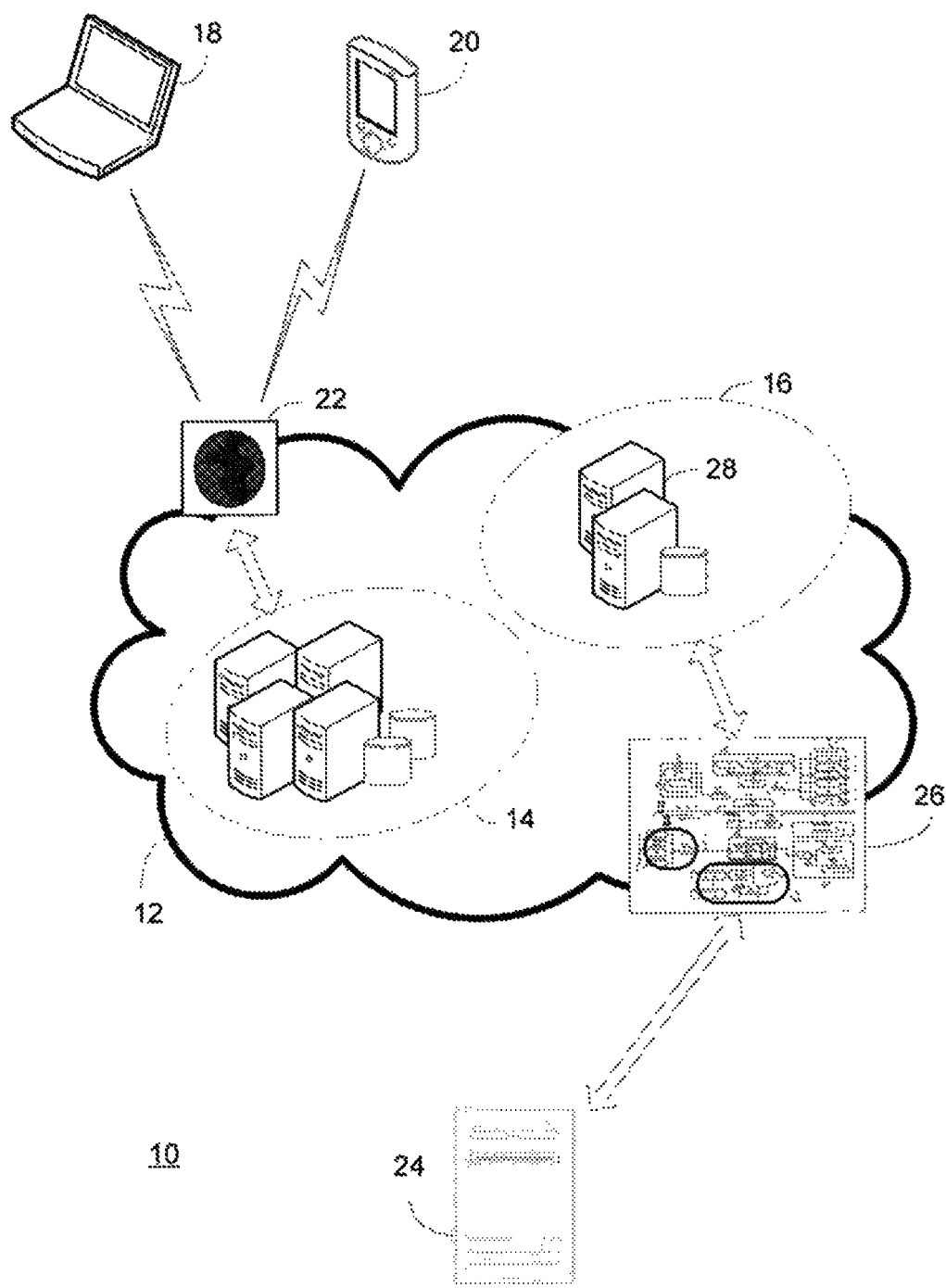
FIG. 1 is a block diagram of a cloud computing environment with services accessible via a utility computing portal.

FIG. 1 illustrates a computing environment 10 with a cloud computing environment 12 having an operational space 14 and a development space 16. Users 18 and 20 may access the operational space 14 via a network interface 22, for example, a URI (Universal Resource Identifier) on the Internet.

A developer 24, representing a number of potential developers, may access the development space 16 via a utility computing portal 26. When connected via the utility computing portal 26, the developer 24 may access services, storage, and development tools associated with the cloud computing environment 12. The utility computing portal 26 is discussed in more detail below with respect to FIGS. 3 and 4.

Figure 2:
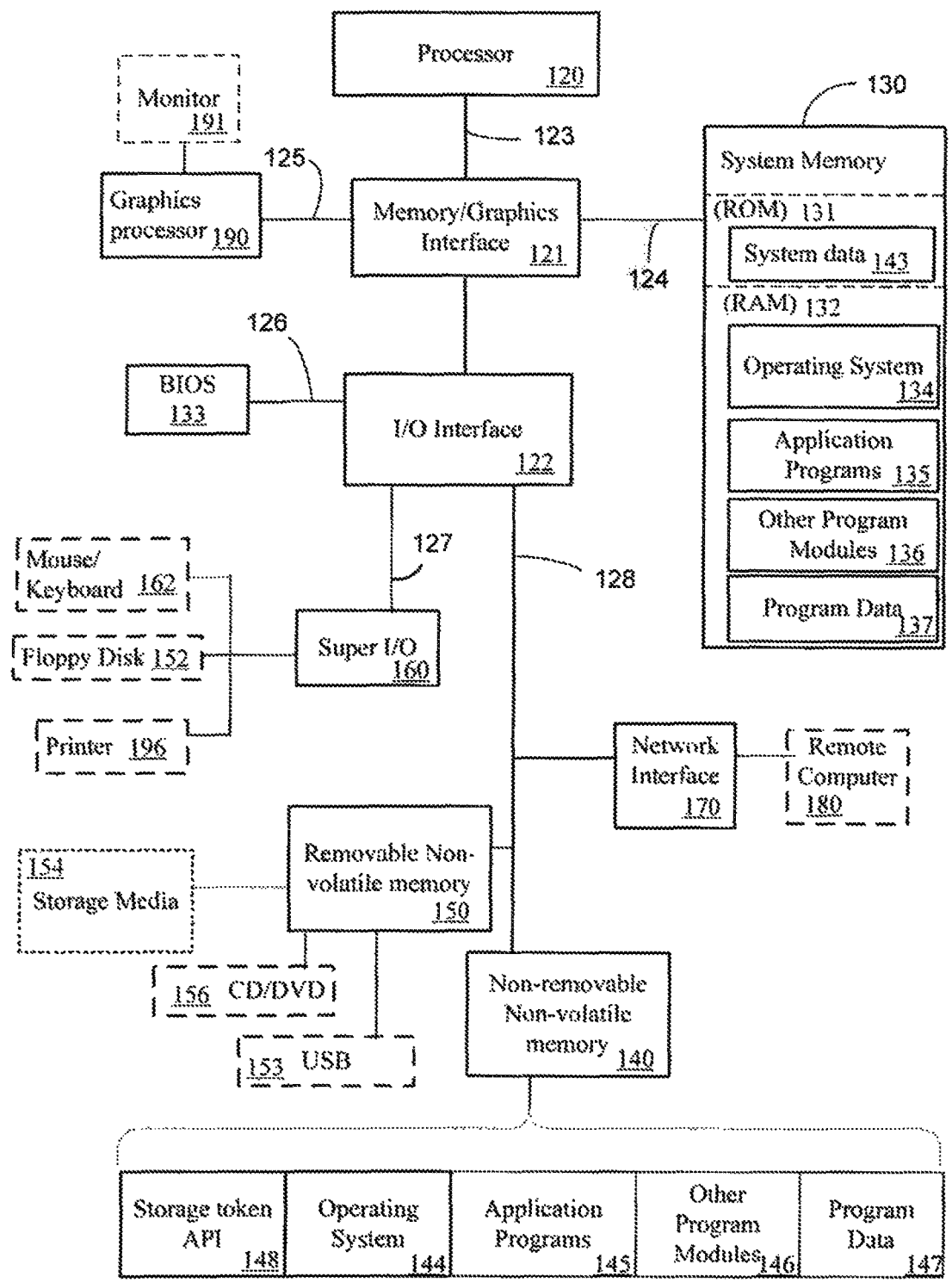
FIG. 2 is a block diagram of a general purpose computing device suitable for use in supporting the mesh platform utility computing portal.

With reference to FIG. 2, an exemplary system for implementing the utility computing portal 26 of FIG. 1 may include a general purpose computing device in the form of a computer 110. Components shown in dashed outline are not technically part of the computer 110, but are used to illustrate the exemplary embodiment of FIG. 2. Components of computer 110 may include, but are not limited to, a processor 120, a system memory 130, a memory/graphics interface 121, also known as a Northbridge chip, and an I/O interface 122, also known as a Southbridge chip. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport™ architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by processor 120. By way of example, and not limitation, FIG. 2 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up.

A super input/output chip 160 may be used to connect to a number of 'legacy' peripherals, such as floppy disk 152, keyboard/mouse 162, and printer 196, as examples. The super I/O Chip 160 may be connected to the I/O interface 122 with a bus 127, such as a low pin count (LPC) bus, in some embodiments. Various embodiments of the super I/O chip 160 are widely available in the commercial marketplace.

In one embodiment, bus 128 may be a Peripheral Component Interconnect (PCI) bus, or a variation thereof, may be used to connect, higher speed peripherals to the I/O interface 122. A PCI bus may also be known as a Mezzanine bus. Variations of the POI bus include the Peripheral Component Interconnect-Express (PCI-E) and the Peripheral Component Interconnect-Extended (PCI-X) busses, the former having a serial interface and the latter being a backward compatible parallel interface. In other embodiments, bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 2 illustrates a hard disk drive 140 that reads from or writes to non-removable, nonvolatile magnetic media. The hard disk drive 140 may be a conventional hard disk drive or may be similar to the storage media described below with respect to FIG. 2.

Removable media, such as a universal serial bus (USB) memory 153, firewire (IEEE 1394), or CD/DVD drive 156 may be connected to the PCI bus 128 directly or through an interface 150. A storage media 154 similar to that described below with respect to FIG. 2 may coupled through interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 2, provide storage of computer readable instructions, data structures, program modules and other data for the computer 110. In FIG. 2, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a mouse/keyboard 162 or other input device combination. Other input devices not shown) may include a microphone, joystick, game pad, satellite dish, scanner, or the like. These and other input devices are often connected to the processor 120 through one of the I/O interface busses, such as the SPI 126, the LPC 127, or the PCI 128, but other busses may be used. In some embodiments, other devices may be coupled to parallel ports, infrared, interfaces, game ports, and the like (not depicted via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 2 may include a local area network (LAN), a wide area network (WAN), or both, but may also include other networks. Such networking environments are commonplace in offices, enterprise-wide computer networks, intranets, and the Internet. The remote computer 180 may also represent a web server supporting interactive sessions with the computer 110.

In some embodiments, the network interface may use a modem (not depicted) when a broadband connection is not available or is not used. It will be appreciated that the network connection shown is exemplary and other means of establishing a communications link between the computers may be used.

Figure 3:
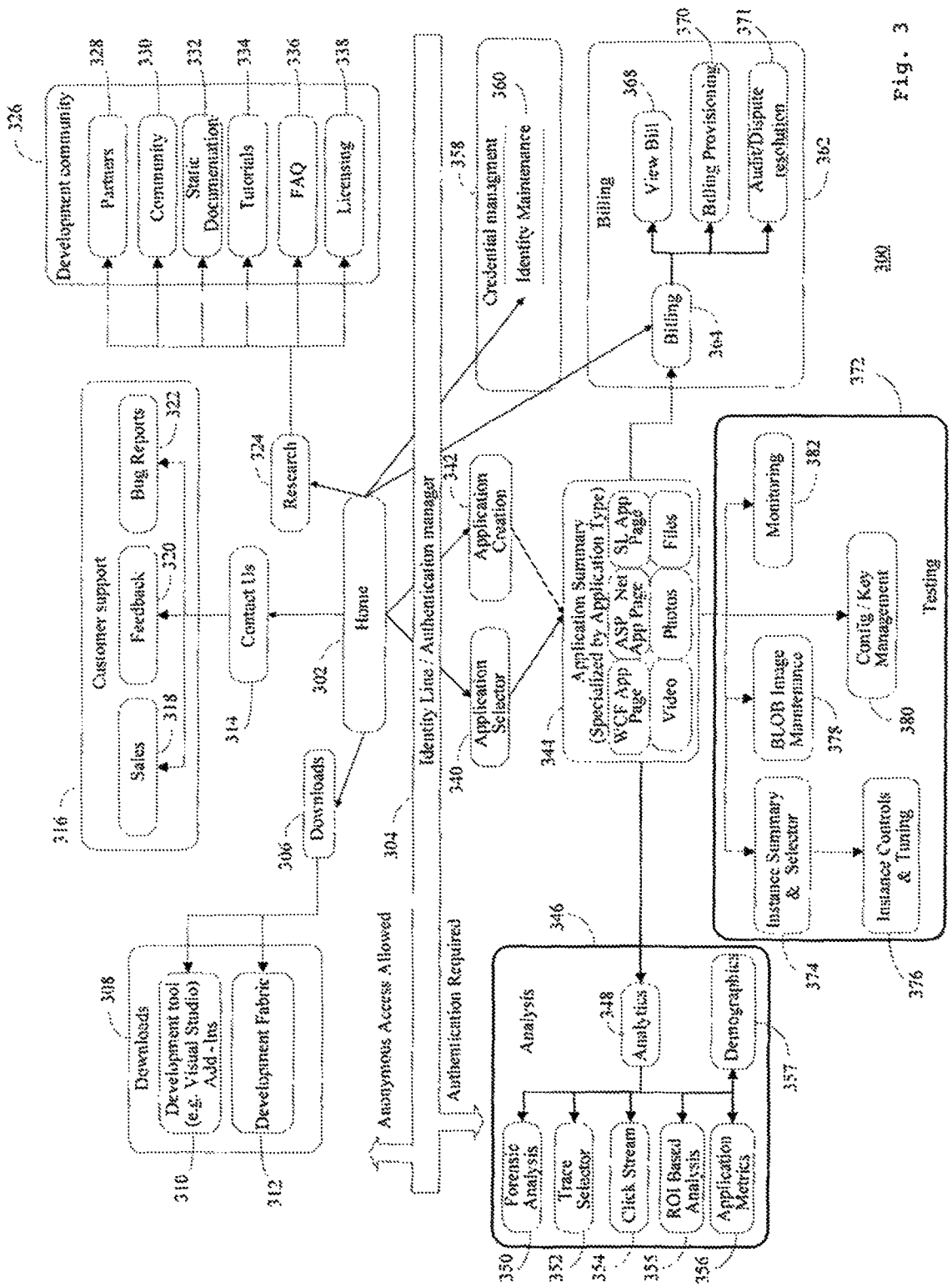
FIG. 3 illustrates a topology of a mesh platform utility computing portal.

FIG. 3 illustrates a topology of a mesh platform utility computing portal, or simply a utility computing portal 300. The utility computing portal 300 may be similar to the utility computing portal 26 of FIG. 1. The topology show representative relationships between home page module 302 and the major modules. As illustrated, an identity line and authentication manager 304 separates public modules above the identity line 304 and private modules below the identity line 304. To traverse from the home page module 302 to the private modules, correct login credentials must be presented.

From the home page module 302, the downloads selection 306 is available, providing access to the downloads module 308. The downloads module 308 may include development tool add-ins 310 and access to the development fabric 312, where applications run. If an application is cataloged by the developer, an instance may be executed in the development fabric 312. Because of the nature of the development space 16 of FIG. 1, a 'sandbox' may be created in which the application may run without risk of interference to or from other applications that may be running in the development space 16.

From the home page module 302, a 'contact us' selection 314 gives users access to a customer support module 316. The customer support module 316 may include a sales module 318 that allows users to sign up for new service or to change the terms of an existing agreement. The feedback module 320 allows collection of feedback from current and prospective users. A bug reporting module 322 allows current users to input information about observed problems for resolution by the host.

The home page module 302 also supports a research selection 324 that gives access to a development community module 326. The development community module 326 may support a number of contact points for distribution of documentation and contact with other developers. For example, partners and community modules 328 and 330 respectively, allow various individuals and organizations to share information about the cloud computing environment and related development aspects. A static documentation module 332 may allow interested parties to access standard documents related to development and operation in the cloud computing environment. The tutorials module 334 may allow users access to self paced instruction materials. A frequently asked questions module 336 allows users to post and receive help on specific topics. A licensing module 338 may provide various legal documents and suggested warding for use in deploying applications on a cloud computing environment.

After a developer has been authenticated at the authentication manager 304, they may be given additional access to private portal modules, such as an application selector module 340 or an application creation module 342. The two modules allow selection of a previously created application or the creation or a new application, respectively. A developer may publish available applications to a catalog of available applications.

Additionally, from the home page module 302, an authenticated developer may also access a credential management module 358 that allows the developer to perform maintenance on his or her account, such as changing a password. Access to a billing module 362 may also be available from the home page 302 two authenticated developers to allow financial management of the account. A billing module 364 may allow a developer to access a bill viewing module 368 or to manage billing provisioning at a module 370, for example, to add or change a credit card number or to change a billing address. The billing module 364 may also accept data from an application summary module 344 related to use of processors and storage for the purpose of generating a bill. An audit module 371 may support auditing and dispute resolution related to resource use, billing, and payments.

The application summary module 344 may display specific information about the selected or newly created application based on the type of application as well as allow execution of an application.

During or after execution of an application under development, and an analysis module 346 may allow access to a number of analytic tools 348. Such tools may include a forensic analysis 350, that allows post execution viewing of resource usage and program flow, including machine and virtual machine usage. A trace selector module 352 may allow post-execution tracing of application execution and a click stream analysis module 354 may allow complex analysis of user movement through and interaction with a web page. A return on investment module 355 may allow a financial analysis of anticipated revenue versus cost of operation. An application metrics module 356 may report storage usage, for example, database usage. A demographics module 357 may allow developer analysis of users of the application.

A testing module 372 may provide a suite of tools for operational management and configuration of an execution environment for the application being developed. An instance summary and selector module 374 may allow examination and selection of various instances of an application created in the cloud computing environment, also known as the fabric. After selection of an instance using module 374 the selected instance may be controlled and module 376, for example, adjusting an amount of memory or a number of front-end and backend processors available to the application instance. A binary large object (BLOB) manager 378 may be used to manage images, sounds, etc., related to the application. A configuration and key management module 380 may allow access controls to be developed and configured for the application. A monitoring module 382 may allow real-time observation of instance execution and characteristics.

Figure 4:
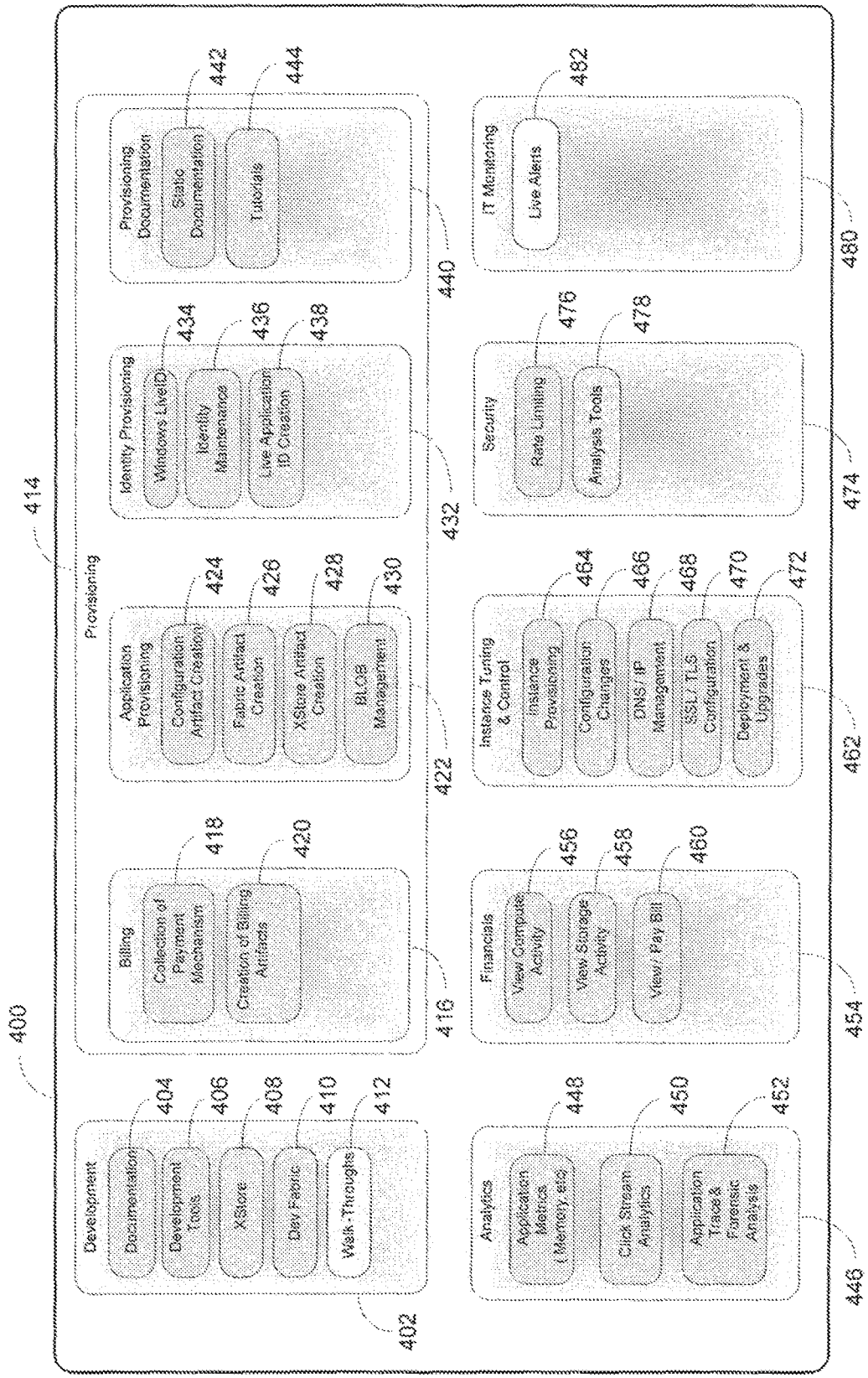
FIG. 4 illustrates a functional view of a mesh platform utility computing portal.

FIG. 4 illustrates a view of a mesh platform utility computing portal 400 expressed as functions. A development function 402 may include documentation 404, development tools 406, such as Visual Studio tools, a device store 408, development fabric 410 supporting execution of development applications, and walk-throughs 412 illustrating sample applications.

The computing portal 400 may also include a provisioning function 414 with a billing function 416 allowing billing creation and collection functions 418 and 420, respectively. The provisioning function 414 may also include an application provisioning function 422. A particular instance of an application in a computing fabric or cloud computing environment may be called an artifact. In that light, the application provisioning function 422 may have functions to create a configuration artifact 424, a fabric artifact 426, a data store artifact 428, and provide for large object management 430. In one embodiment, the application provisioning function 422 may create a tenant, that is an application artifact, and assigned a role to the tenant. For example, a tenant may have a role as a front end or backend. That is, a front and tenant may support client interaction while a backend tenant may support database interaction.

An identity provisioning function 432 supports functions such as external identification 434, for example, using a Windows Live ID as an authentication mechanism for a developer. The identity provisioning function 432 may also include a function for identity maintenance 434 to allow management of a developer's identity, contact information, and password management. An application ID function 438 may allow individual applications, or instances of applications, to create permanent or transient identities for use while executing.

Part of the provisioning function 414 may include a documentation function 440, that may include support for static, that is, fixed over a relatively long period, documentation 442 as well as tutorials 444. Functions related to application development and billing may include an analytics function 446, a financials function 454, instance tuning and control functions 462, security functions 474, and operational monitoring functions 480.

The analytics function 446 may include an application metrics function 448 to allow measurement of processor and memory usage as well as data traffic volumes, etc. Extreme analytics 450 is a function that allowing analysis of user interaction with a web site. Tracing forensic analysis functions 452 may allow a developer to analyze and debug application code.

The financials function 454 may include not only the ability to capture and present processor usage 456 and storage usage 458, but may also support a function 460 to allow a developer to view and pay the bill associated with use of development fabric.

The instance tuning and control functions 462 may include an instance provisioning 464, that is, activation of an instance of an application as well as configuration changes 466 that allow processor and memory used to be set. DNS and IP management function 468 may allow traffic and routing management to be specified. SSL/TLS configuration function 470 may allow a developer to specify the type of data transport security to be used by the application, supporting both user interaction and interaction with other functions or applications within the fabric/cloud computing environment. A deployment function 472 may allow a developer to manage release of upgrades and/or parallel support of different versions for comparison purposes.

A security function 474 may include a rate limiting function 476 for protecting against runaway code or unexpected interactions. Security function 474 may also include security analysis tools 478 to allow a developer insight into security risks associated with final deployment.

An IT monitoring function 480 may allow alerts 482 to be sent daring the course of application development and testing.

Figure 5:
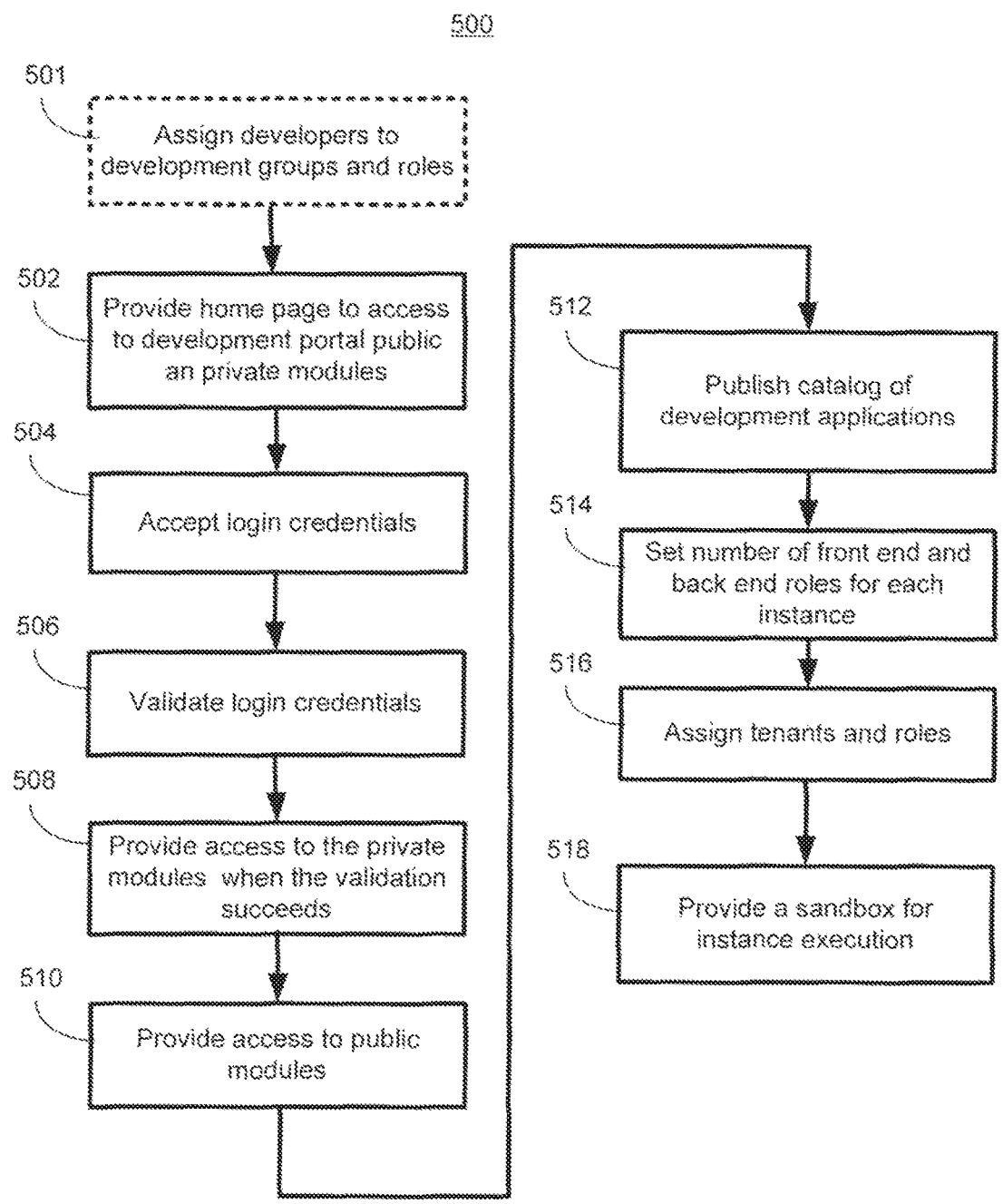
FIG. 5 is a flow chart of a method of operating a mesh platform utility computing portal.

FIG. 5 is a flow chart of a method 500 of providing support to cloud computing developers. At block 501, a developer may optionally be assigned to a group of developers, for example, by allowing the developer access to a set of cloud application development data. A development team may be formed by granting access to additional developers. In some embodiments, a developer may be assigned to more than one development team by granting the developer access to more than one set of cloud application development data. Additionally, some developers may be assigned different roles, such as, System Administrator, Development Lead, Program manager, etc. Each of these roles may be allowed varying access to both the development data and the controls associated with execution of the associated application. For example, the development lead may have access to each team members specific code, while only the program manager can affect controls such as instance tuning the number of front and back ends allocated to an application instance.

At block 502, an access page 302 may be provided that presents public and private modules. The access page may support login access to the private modules and open access to the public modules.

At block 504, the access page 302 or an authentication manager 304 accessible to the access page 302 may accept login credentials for access to the private modules.

At block 506, login credentials, when provided, may be validated.

At block 508, access to the private modules may be provided if the login credentials are successfully validated at block 506. The private modules may include an application selector module 340, an application creation module 342, an analysis module 346, a test module 372, and a billing module 362.

At block 510, access to the public modules may be provided, including a downloads module 308, a customer support module 316, and a development community module 326.

At block 512, a developer may publish a catalog of development applications. The catalog may allow related developers and testers, as well as the primary developer(s) to review current applications in development.

At block 514, a number of front end and backend virtual machines may be configured using instance tuning controls 376.

At block 516, a service may be provisioned with a tenant identifier may be created and assigned a role. For example, as front end or backend tenants of the previously assigned virtual machines.

At block 518, execution of the application may be supported in a sandbox. The sandbox allows isolated application execution so that unwanted interactions with other applications are not a problem. The application may support user interface-oriented applications, for example, client support for a browser-based application. In another embodiment the application under development may be a no-user interface batch processing application.

The utility computing portal 26 provides a single access point for development management, tool access, billing, and testing. Because of the cost and complexity of a mesh network/cloud computing environment, developers can benefit from the ability to provision and execute applications in a cloud computing environment that is secure from intruders and competitors. The utility computing portal 26 also allows a single log in for access to billing information, environment configuration, test tools, etc. Only when satisfactorily tested, does a developer expose the application to an operational space 14.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

The invention claimed is:

1. A system comprising:
   at least one computing device of a cloud computing environment that comprises an operational space and a separate development space, the at least one computing device comprising at least one processor and memory, and the at least one computing device configured to:
   activate an instance of an application in the separate development space of the cloud computing environment, where the separate development space is protected and secure relative to the operational space, and where the separate development space is a protected and secure space of the cloud computing environment configured for developing and testing applications that include the application;
   select the activated instance of the application in the separate development space of the cloud computing environment; and
   set a number of processors and an amount of memory in the separate development space of the cloud computing environment available to the selected instance of the application, where the number of processors is selected from at least front-end processors and back-end processors.

2. The system of claim 1 where the separate development space facilitates development of the application without interference from other applications.

3. The system of claim 1, where the at least one computing device is further configured to examine the activated instance of the application.

4. The system of claim 1, where the at least one computing device is further configured to manage images, sounds, and other objects related to the application.

5. The system of claim 1, where the at least one computing device is further configured to provide for development of access controls for the application.

6. The system of claim 1, where the at least one computing device is further configured to provide for real-time observation of the activated instance of the application.

7. A method performed on at least one computing device of a cloud computing environment that comprises an operational space and a separate development space, the at least one computing device including at least one processor and memory, the method comprising:
   activating, by the at least one computing device, an instance of an application in the separate development space of the cloud computing environment, where the separate development space is protected and secure relative to the operational space, and where the separate development space is a protected and secure space of the cloud computing environment configured for developing and testing applications that include the application;
   selecting, by the at least one computing device, the activated instance of the application in the separate development space of the cloud computing environment; and
   setting, by the at least one computing device, a number of processors and an amount of memory in the separate development space of the cloud computing environment available to the selected instance of the application, where the number of processors is selected from at least front-end processors and back-end processors.

8. The method of claim 7 where the separate development space facilitates development of the application without interference from other applications.

9. The method of claim 7 further comprising selecting and examining, by the at least one computing device instance of the application.

10. The method of claim 7 further comprising managing, by the at least one computing device, images, sounds, and other objects related to the application.

11. The method of claim 7 further comprising providing, by the at least one computing device, for development of access controls for the application.

12. The method of claim 7 further comprising providing, by the at least one computing device, for real-time observation of the activated instance of the application.

13. At least one computer storage device comprising:
   memory that comprises executable instructions that, based on execution by at least one computing device of a cloud computing environment that comprises an operational space and a separate development space, configure the at least one computing device to perform actions comprising:
   activating, by the at least one computing device, an instance of an application in the separate development space of the cloud computing environment, where the separate development space is protected and secure relative to the operational space, and where the separate development space is a protected and secure space of the cloud computing environment configured for developing and testing applications that include the application;
   selecting, by the at least one computing device, the activated instance of the application in the separate development space of the cloud computing environment; and
   setting, by the at least one computing device, a number of processors and an amount of memory in the separate development space of the cloud computing environment available to the selected instance of the application, where the number of processors is selected from at least front-end processors and back-end processors.

14. The at least one computer storage device of claim 13 where the separate development space facilitates development of the application without interference from other applications.

15. The at least one computer storage device of claim 13, the actions further comprising selecting and examining, by the at least one computing device, the activated instance of the application.

16. The at least one computer storage device of claim 13, the actions further comprising managing, by the at least one computing device, images, sounds, and other objects related to the application.

17. The at least one computer storage device of claim 13, the actions further comprising providing, by the at least one computing device, for development of access controls for the application.

18. The at least one computer storage device of claim 13, the actions further comprising providing, by the at least one computing device, for configuring a number of front-end and back-end virtual machines.

* * * * *